Patented May 27, 1952

2,597,871

UNITED STATES PATENT OFFICE 2,597,871

WAX EMULSION POLISHING COMPOSITION CONTAINING SILICA

Ralph K. Iler, Cleveland Heights, Ohio, assignor to E. I. du Pont de Nemours & Company, Wilmington, Del., a corporation of Delaware No Drawing. Application September 20, 1947, Serial No. 775,375

8 Claims. (Cl. 106—10)

This invention relates to novel wax compositions and more particularly to compositions which comprise aqueous dispersions of a wax and colloidal silica and which when applied to surfaces produce a film having improved slip-resistance without loss of luster.

This application is a continuation-in-part of my application Serial No. 699,087, filed September 24, 1946, for "Chemical Compositions," now abandoned.

Wax coatings are commonly applied to the surfaces of furniture, automobiles, and wood, asphalt tile, and linoleum floors for the purpose of imparting a pleasing, lustrous appearance and a protective film against dirt and moisture. Suspensions of such waxes as carnauba, montan, candelilla, beeswax and paraffin have been used for this purpose and have been applied in such forms as aqueous dispersions and solvent-containing pastes. Some of these compositions are of the "self-polishing" type, that is, they are applied as a suspension of wax in a carrier such as water and dry to a polished appearance without further rubbing.

Many wax polishes which have been proposed give coatings of pleasing appearance but which unfortunately are lacking in resistance to slipping. Such formulations, when applied to lineoleum floors, for instance, give coatings which are not entirely safe to walk upon, in that leather shoe soles slide quite easily upon them. Similarly, rugs placed upon floors waxed with such materials slide readily when stepped upon and constantly are a hazard.

Efforts have been made to correct this lack of slip-resistance by including other materials, for example, ground feldspar, in the wax formulation. Such inclusions, however, often result in an impairment of the luster and pleasing appearance of the wax-coated surface.

Now according to the present invention it has been found that by including colloidal silica in aqueous wax dispersions novel compositions are produced, from which coatings may be made having a marked improvement in slip-resistance without any loss in luster and with an improvement in the luster of normally low-gloss coatings.

The invention has application to such aqueous wax dispersions as the relatively dilute wax suspensions of the self-polishing type, the more concentrated water-containing wax pastes, and other such compositions in which a wax is dispersed in an aqueous medium. The improvement in slip-resistance is, of course, particularly important in the case of floor waxes. The advantage of freedom from loss of luster is particularly important in the case of the self-polishing wax polishes. Moreover, inclusion of colloidal silica according to the invention has the further advantage of improving the luster of films obtainable from certain wax suspensions. The suspensions, without the colloidal silica, ordinarily give coatings of poor luster which are herein referred to as "normally low-gloss coatings." Such compositions are used despite their poor luster because their ingredients are relatively cheap, and the silica inclusion therefore is particularly desirable because it renders these compositions competitive with more expensive high gloss products.

The improvement in slip resistance effected by inclusion of colloidal silica in a wax coating will be understood to mean the increase in force parallel to the plane of the wax coating required to cause an object, such as a shoe sole, to slide over the wax coating, as compared to the similar force for the coating without the silica inclusion.

The improvement in luster of normally low gloss coatings occasioned by inclusion of colloidal silica refers to the increase in light reflectance thus obtained. It will be understood that this effect is most pronounced for coatings which without the silica have the poorest luster.

The term "wax" as used herein will be understood to include not only the naturally occurring materials composed largely of fatty acid esters of high molecular weight monohydric alcohols, such as carnauba, candelilla, and beeswax but also other organic, water-insoluble materials which have the physical character of waxes. This is in accord with general usage in the art, as is illustrated in an article entitled "Waxes in Industry—I" by A. H. Woodhead, in "Paint Manufacture," vol. 17, page 40 (1947).

"It has been the practice in recent years to include in the term 'wax' those substances which bear some physical resemblance to any of the natural waxes, including paraffins and ozokerites. This definition is more useful since the inception of a large range of synthetic products of wax-like appearance and physical behaviour, and it is due to this conception that such substances as naphthalene chlorides, polyethylenes, many higher hydrocarbons, and even glyceride esters are now termed 'waxes' and are used industrially as waxes. A wax, then, is a substance, usually complex, which is of amorphous or microcrystalline structure and usually lacking excessive 'tack' at normal temperature, and which melts fairly sharply to give a (usually) mobile liquid at a temperature but little higher than its normal melting-point. This definition largely excludes resins and the common simpler crystalloidal chemicals."

While this definition largely excludes resins it will be noted that there is a group of high molecular weight polymeric materials commonly called "synthetic waxes" which have wax-like physical properties and hence are included within the definition. It has been found that emulsions or, more properly, suspensions of such high molecular weight polymeric waxes, in combination with colloidal silica, particularly sodium-stabilized colloidal silica, provide improved waterproofing and polishing compositions in accordance with this invention.

The waxes thus fall into three general categories, namely, the ester waxes mentioned above which are usually naturally occurring either as plant exudations or animal excreta, the hydrocarbon waxes, often referred to as mineral waxes, including montan, ozokerite, ceresin, and paraffin, and synthetic polymeric waxes, including condensation products of hardened castor oil or octadecanediol with boric acid, monobasic carboxylic acid esters of perhydrogenated novolac, polyethylene adipate, telomerization products of ethylene and dichloracetic acid, and ethylene/bromacetic acid. The term "novolac'" as used herein refers to linear, thermoplastic, phenol-formaldehyde polymers having the typical formula ... $C_6H_3(OH)CH_2C_6H_3(OH)CH_2$ . . ., as described in "Chemistry of Commercial Plastics" by R. L. Wakeman, Reinhold Publishing Corp., 1947, at p. 118. A carboxylic acid ester of perhydrogenated novolac thus is a novolac which has undergone substantially complete hydrogenation of the benzene rings to give cyclohexane rings and the hydroxyl on each ring of which has been esterified with a carboxylic acid. The term "telomerization products" refers to polymers of ethylene wherein the polymerization has been terminated by such agents as dichloroacetic acid or bromacetic acid, as described more fully in Example 11, below.

The amount of a wax used in an aqueous dispersion of this invention may be widely varied depending upon the particular use for which the composition is intended. When the composition is in paste form, as in the "rub-to-polish" type, the proportion of wax may be from 20 to 40% by weight of the total. On the other hand, in the aqueous wax dispersions of the "self-polishing" type, in which the colloidal silica is particularly effective, the proportion of wax may be from about 10 to 15% by weight of the total.

The term "colloidal silica" as used in describing this invention refers to silica in the form of particles of colloidal dimensions, that is, particles having an average size not exceeding about 100 millimicrons nor less than about 1 millimicron. It is particularly preferred to use colloidal silica having an average ultimate particle size less than about 30 millimicrons, that is, 0.03 micron. By "ultimate particle size" is meant the average size of particle present when the solution is diluted to about 0.1% $SiO_2$ with water and dried in a very thin layer deposit.

The silica particles will not necessarily be present as anhydrous silicon dioxide but rather, may be in a hydrated form associated with various proportions of water. Thus, partially dehydrated silicic acid would come within the term "silica" as herein used.

The colloidal silica may be prepared by methods with which the art is already acquainted. Thus it may be prepared by neutralizing a sodium silicate solution with an acid and dialyzing out the sodium salt. Such solutions of silica, however, are characteristically unstable and are impractical to use.

More recently there have become available relatively concentrated silica sols which have sufficient stability to make their use in wax dispersions practical. Such a sol may be prepared, for instance, by redispersing a silica gel with an alkali as described in Neundlinger Patent 1,835,420 or White Patent 2,375,738. According to these methods silica sols which are relatively stable and which contain up to about 18% $SiO_2$ may be prepared in a suitable form for use in aqueous wax dispersions. Unfortunately such dispersions contain a minor proportion of very high molecular weight colloidal silica which tends to give a heterogeneous solution.

Another commercially available colloidal silica solution which may be used is characterized by having an $SiO_2$ content of about 15%, a viscosity of 27.6 centipoises at 25° C., and the following chemical analysis:

| | |
|---|---|
| $Na_2O$ | 0.28 |
| $SO_4$ as $Na_2SO_4$ | 0.06 |
| Sulfated non-siliceous ash | 0.82 |
| pH | 9.5 |
| $SiO_2/Na_2O$ wt. ratio | 55:1 |
| Molecular weight (average) | 11 million |

It is particularly preferred to use colloidal solutions of silica in which the silica particles are characterized by having alkali ions so disposed on the surface of the particles as to prevent condensation between the particles by oxolation in an aqueous solution of a concentration not exceeding about 45% $SiO_2$ by weight. As freshly prepared, the silicic acid in a silica solution may exist as low molecular weight polymers of the theoretical $Si(OH)_4$; however, a condensation reaction known as "oxolation" rapidly occurs whereby water splits out between hydroxyl groups attached to silicon atoms, an Si—O—Si linkage is formed, and a polymer is produced. This process may continue indefinitely and in such a manner that the silicic acid solution rapidly sets up to a gel, the oxolation occurring between externally disposed hydroxyls, i. e., hydroxyls not already inactivated by being inwardly located within a siloxane ring or micelle. It has been found, however, that such polymerization is retarded by the presence of a small amount of combined alkali such as sodium.

A logical explanation for such retardation of the gelling rate of silicic acid solution has been that the sodium ions act as "blocking groups" by replacing the active acid hydrogen in a sufficient number of externally disposed hydroxyl groups to prevent further oxolation in a concentration not exceeding about 45% $SiO_2$. This stabilization may be accomplished by processes described in the Bird Patent, 2,244,325. In order to produce stable solutions with a minimum of alkali stabilizing agent, the polymerization of the silicic acid may be carried to a relatively high molecular weight so as to produce large molecules or colloidal particles which then retain only a small percentage of the reactive hydroxyl groups originally present, and which thus require only a small amount of alkali as a stabilizer. On the other hand the polymerization must not proceed to the formation of a gel.

A very practical method for producing stabilized aqueous colloidal silica solutions consists in passing an alkali silicate solution through an acid-regenerated ion exchange resin as described in the above-mentioned Bird patent whereby alkali ions are removed from the silicate and replaced with hydrogen ions. In this instance the alkali ions may be completely removed and then alkali hydroxide may be added to furnish the necessary alkali ions required as blocking groups.

A particular stabilized aqueous colloidal silica solution which may be used in a composition of this invention is described in the Bird patent at page 2, column 1, lines 12 to 68. As stated in the Bird patent the weight ratio of $SiO_2$ to $Na_2O$ may be as high as from 75 to 100:1 and as low as 10:1, but ratios from 30:1 to 80:1 give superior results and are preferred. The higher the ratio, of course, the lower will be the number of sodium ions present as blocking groups.

This disclosure in the Bird patent describes the preparation of an effluent from the ion exchanger having a silica content of about 3 to 3.5% which may be evaporated, preferably in a vacuum evaporator to about one-half its original bulk thereby raising its silica content to about 6 to 6.5%. Even at 6.5% $SiO_2$ the solutions are too dilute to be shipped, stored, and handled economically and it is preferred to evaporate them to an $SiO_2$ content of from 18 to 30%. This may be done in a number of ways and the product obtained will have somewhat different characteristics depending upon the method of evaporation. For instance the evaporation may be carried out in the batchwise manner at constant volume, by adding a suitable volume of effluent from the ion exchanger to the evaporator and adding additional fresh effluent at the same rate that water is evaporated off so that the volume in the evaporator remains substantially constant. This evaporation may be carried out at atmospheric pressure or even superatmospheric pressure to give a product having maximum stability and containing as high as 30 to 35% $SiO_2$. The molecular weight of the silica is about from 0.6 to 4.0 million and the average particle size is well below 30 millimicrons.

An alternative method of evaporation, which gives a product of higher molecular weight but still of colloidal dimensions, may be obtained by carrying out the evaporation at constant volume but in a continuous manner. Thus, from a constant volume in the evaporator concentrated product is continuously withdrawn and fresh effluent is added at a rate sufficient to maintain constant volume in the evaporator and to make up the decrease effected by evaporation and product withdrawal. The product thus obtained contains particles of substantially uniform size corresponding to a molecular weight lying in the range of about from 0.6 to 100.0 million.

The preferred colloidal silica solutions for use in wax dispersions of this invention prepared according to ion-exchange methods as above described and designated as alkali-stabilized are characterized by containing silica particles having an average molecular weight of about from 0.6 to 100.0 million as determined by light scattering in aqueous dispersion. The theory of the light scattering method for determining molecular weight is described in an article by R. Stein and P. Doty, Journal American Chemical Society, 68, 159 (1946). According to this theory, the weight-average-molecular-weight, $M_w$, is a function of the turbidity, $\tau$, and the concentration, $C$, of a polymeric dispersion of solution, according to the following equations:

$$HC/\tau = 1/M_w + 2BC/RT \quad \text{(Equation } a\text{)}$$

where:

$C$ = concentration of solute in g. solute/cc. of solution.
$M_w$ = weight-average-molecular-weight of solute in g./mole.
$B$ = constant, characteristic of the system, which may be determined by osmotic pressure measurements, in erg×cc. of solution/g.$^2$ of solute.
$R$ = gas constant in erg/mole of solute/degree of temperature.
$T$ = absolute temperature in degrees.
$\tau$ = turbidity (extinction coefficient for scattering at right angles in cm.$^{-1}$).

$$H = \frac{32\pi^3 n^2 \left(\frac{dn}{dc}\right)^2}{3\lambda^4 N_0} \quad \text{(Equation } b\text{)}$$

$n$ = refractive index in air of the solution.

$\frac{dn}{dc}$ = index of refraction gradient between solvent and solution in terms of g./cc.

$\lambda$ = wave length in air of light used, in cm.
$N_0 = 6.02 \times 10^{23}$ particles/mole (Avogadro's number).

With reference to Figure 1 of the Stein and Doty article, the mercury lamp A serves as the light source which is first rendered monochromatic (5461 Å.) by the mounted Corning filters B and then made parallel by a collimating lens C in conjunction with a small 1.5 cm. diaphragm D. Neutral filters to reduce the intensity of the light during the calibration are inserted before the diaphragm instead of in the position E indicated on Figure 1. A semitransparent glass plate E mounted after the green filters reflects a small fraction of the beam through an opalescent glass plate F and thence into the photometer K, to be compared visually with the light scattered at 90° by the solution. A square glass cell G containing the polymer solution is immersed in a water-filled chamber $h$ to reduce reflection at the interfaces, and the water-filled chamber is surrounded by circulating water for temperature control. The light reflected at 90° by the solution is transmitted through a lens J into the other side of the photometer and compared with the standard beam. A cone I absorbs the transmitted light by multiple reflection. Readings are taken directly from the dials M on the photometer.

During calibration only, two neutral filters are inserted to reduce the light intensity of the entire incident beam. The calibration is based either on a magnesium carbonate surface placed at 45° to the incident beam, or on a similarly placed vitrolite surface whose absolute reflectance is known. Readings are taken when matched fields are obtained. The two neutral filters are removed and the block is then replaced by a solution of the polymer of known concentration and again a reading is taken when the fields are matched. The properties of light make it possible to correlate the dial readings obtained during the calibration with the solution values and to obtain values for absolute turbidity.

Values for $n$ and for $$\frac{dn}{dc}$$

are determined separately, and the refractometer used to determine these values should be accurate to the fourth decimal place, since the difference between the refractive index of water and a 1% SiO$_2$ solution ranges from only 0.0007 to 0.0009, depending on the type of silica.

Values for absolute turbidity obtained by the above photometer readings can be treated graphically or by calculation. Concentration/turbidity is plotted against concentration for four or five points on a given solution. M$_w$ may be determined by extrapolation of the best straight line drawn visually through these points and use of the intercept in Equation a. More accurate values are obtained by calculating the intercept and the slope by, for example, the method of least squares.

The alkali-stabilized colloidal silica solutions incoporated in the compositions of this invention are still further characterized by having, in dilute aqueous solution, an extincition coefficient of less than 0.25 for light having a wavelength of 400 millimicrons.

Colloidal suspensions are more or less cloudy to visible light, depending upon the wavelength, the finer the particles the clearer the solution. Other factors, such as the relative refractive indices of the particles with respect to the solvent or dispersion medium, of course also play a role in determining the degree of turbidity, but, in general, the appearance of the solution gives some indication of the relative size of the dispersed particles in any given system.

By comparing solutions of colloidal silica at the same concentration of SiO$_2$, the relative transparency to light is an indication of the type of particles present. However, by working with monochromatic light and by measuring the percentage of light transmitted through a solution of given depth at a given concentration of silica, there can be calculated a constant, known as the "extinction coefficient."

By a combination of Beer's and Lambert's law, the following formula can be arrived at:[1]

$$E^{1\%}_{1\,cm.} = \frac{1}{pL} \log_{10}\left(\frac{I_0}{I}\right)$$

where $E^{1\%}_{1\,cm.}$ = extinction coefficient
$p$ = per cent by weight of SiO$_2$ in the colloidal solution
$L$ = length of adsorption cell in centimeters
$I_0$ = 100, taking the transmission of the dispersion medium, water, to be 100
$I$ = observed transmission of light of a given wavelength as compared to the transmission of pure water.

It will be noted that the extinction coefficient for a given type of solution is a constant which is independent of the concentration of the solution and of the length of the cell through which the light passes, but the numerical value depends upon the manner in which the concentration of the solution is expressed and upon the unit in which the length of the cell is measured. In this case, the extinction coefficient is given in terms of the percentage by weight of silica in solution and in terms of centimeters of cell length.

Since light consists of electromagnetic waves, it is, of course, important to choose a wavelength such that the colloidal particles involved will have some action on the waves. For example, if one chose to use infra-red light, it is possible that colloidal solutions of sub-microscopic particles might be almost equally transparent, while if a very short wavelength in the ultra-violet range

[1] See Gibb, 1st ed., "Optical Methods of Analysis," page 73 et seq. (1942).

were used, relatively small differences in particle size would make a considerable difference in the relative percentage transmission of light through the two solutions being compared. It has been found that colloidal solutions of silica having an ultimate particle size less than 0.03 micron can be distinguished from colloidal solutions of silica having particles considerably larger than this figure, by comparing them with ultra violet light having a wavelength of 400 millimicrons.

It has been found according to this invention that colloidal solutions of silica having an extinction coefficient of less than 0.25 are especially useful for incorporating into aqueous dispersions of wax.

The proportion of colloidal silica used in an aqueous dispersion of this invention may be considerably varied depending upon the use for which the composition is intended. In paste waxes of the "rub-to-polish" type containing from 20 to 40% wax the composition may contain up to about 18% by weight of colloidal silica, calculated as SiO$_2$. In the aqueous dispersions of the "self-polishing" type, containing from about 10 to 15% of wax, the colloidal silica is preferably in the range of about 3 to 9% by weight, calculated as SiO$_2$.

The aqueous wax dispersions of this invention may be prepared according to methods with which the art is familiar and will ordinarily contain a dispersing agent such as mono-, di-, or triethanolamine oleate or stearate, 2-amino, 2-methyl 1-propanol, sodium or potassium soaps, morpholine oleate, or monoethylamine oleate. In the examples given below the methods of preparation referred to by Roman numerals are as follows:

METHOD I

This is perhaps the simplest and most easily controlled method, but its use is limited to the more easily dispersed waxes, such as carnauba, montan, candelilla, etc.

The wax to be dispersed is placed in the beaker which is immersed in the steam bath (to prevent wax caking on the sides) and melted. The oleic acid can be melted along with the wax, can be added when half the wax is melted or after all the wax is melted, but in the present use the oleic acid (or stearic acid), was added when half the wax was melted. Meanwhile on a separate hotplate the correct amount of water is brought to the boiling point. To the melted wax is added the triethanolamine (morpholine, etc.) and stirred thoroughly. To this is then added the boiling water and the mixture is vigorously stirred to form a smooth suspension of wax in water. When potassium hydroxide and/or borax are called for in the formulation they can be added to the water before pouring into the wax or in the case of the dissolved potassium hydroxide, it can be added immediately after the triethanolamine is added. In the case of the test suspensions the colloidal silica is added to the water before the latter is added to the melted wax.

METHOD II

[C. H. Bennett, "Commercial Waxes," pages 469 to 470.]

In this method, the wax or oil is emulsified by means of a water solution of the soap which is made from triethanolamine and stearic acid (or oleic acid). The water is measured out into a container which can be heated. The triethanolamine is then added and stirred into this and then the stearic acid is added. On being heated, the acid gradually melts and can be stirred into the water to give a smooth soap solution, and the temperature is raised to just below the boiling point. The wax is now melted in a separate container and its temperature brought to 85-95° C. This is then added to the water solution and the whole solution at once stirred vigorously to obtain a good emulsion. Stirring is then continued gently until the product has cooled.

It should be noted that when the water is added to the wax care should be exercised since a great amount of foaming is produced and the wax is dispersed with almost explosive violence. In the case of the test mixtures the colloidal silica was added to the water just before it was poured into the wax.

METHOD III

This was a modification of Method II. The potassium hydroxide, triethanolamine, and oleic acid were added to the water which had previously been dropped to 90° C. with rapid agitation. In the meantime the wax was brought to a temperature of 140-150° C. The wax was added to the aqueous solution slowly with rapid agitation. After all the wax had been added the resulting suspension was stirred for five minutes. The suspension was then cooled for five minutes with no agitation and then the beaker was floated in a large pail of water until cooled. While cooling the suspension was stirred occasionally to break up a thin crust which formed on the surface. When colloidal silica solution was present it was added to the water at the start of the preparation.

METHOD IV

This method was particularly effective for dispersing synthetic waxes. The dispersing agent and wax were placed in an aluminum beaker, melted together, and the hot melt stirred with a drink mixer. This mixture was then heated to 140-150° C. on a hot plate. In the mean time the water was brought to a temperature of 90° C. and 30% of the water was slowly added to the hot wax solution with rapid stirring. The resulting emulsion was then slowly added to the remaining water at 90° C. This procedure was adopted because it gave extremely finely divided, stable dispersions of carnauba wax which dried to continuous, lustrous films.

The invention will be better understood by reference to the following illustrative examples. In these examples, unless otherwise designated, the colloidal silica is sodium-stabilized, prepared by passing sodium silicate through an ion-exchange resin and concentrating the effluent by batchwise constant volume evaporation to 30% $SiO_2$ by weight. The average molecular weight of this colloidal silica solution was about from 2 to 3 million as determined by light scattering. The method used in preparing the aqueous wax dispersions in each example is designated by Roman numerals I, II, III, or IV which refer to the methods as described above. In each example a comparable control formulation was prepared in a similar manner except that the colloidal silica was omitted with an appropriate compensation in the water content.

Example 1

This is an example of an aqueous dispersion containing an ester type wax and colloidal silica prepared according to Method I. An aqueous dispersion of wax containing colloidal silica suitable for use as a self-polishing floor wax was made up with the following components in the indicated proportions by weight:

| Component | Parts By Weight | Per cent By Weight of Total |
|---|---|---|
| Carnauba wax (No. 2 N. C.) | 40.0 | 13.64 |
| Triethanolamine | 4.0 | 1.36 |
| Oleic acid | 8.0 | 2.73 |
| Potassium hydroxide (85% KOH) | 0.5 | .17 |
| Water | 186.7 | 76.50 |
| Colloidal silica, 30% aqueous sol'n | 53.3 | 5.46 (as $SiO_2$) |

This composition had a pH of 8.51, a viscosity of 7.13 centipoises at 33° C., and a surface tension of 31.5 dynes/cm. at 33° C.

The composition was applied as a thin coating to a linoleum floor and was found to dry to a lustrous coating without rubbing. The coating was found to be remarkably resistant to slipping when walked upon with leather soles, being in this respect outstandingly superior to a similar control coating made with a similar formulation except from which the silica had been omitted.

Example 2

An aqueous wax dispersion containing colloidal silica was made up according to Method II containing the following components:

| Component | Parts By Weight | Per cent By Weight of Total |
|---|---|---|
| Carnauba wax (No. 2 N. C.) | 43.5 | 15.64 |
| Stearic acid | 4.5 | 1.62 |
| Triethanolamine | 2.0 | 0.72 |
| Water | 169.7 | 75.6 |
| Colloidal silica, 30% $SiO_2$ | 57.8 | 6.26 (as $SiO_2$) |

The dispersion thus obtained had a pH of 8.19 and a viscosity of 176 centipoises at 33.5° C.

The aqueous dispersion obtained was found to be suitable as a self-polishing floor wax on a linoleum floor, giving a high luster and being substantially skid resistant as compared with the control prepared in a similar manner except omitting the silica.

Example 3

In this example another type of ester wax, namely, beeswax, was used. An aqueous wax dispersion containing colloidal silica was made up according to Method I containing the following components:

| Component | Parts By Weight | Per cent By Weight of Total |
|---|---|---|
| Beeswax (yellow) | 44 | 17.6 |
| Oleic acid | 4.5 | 2.0 |
| Triethanolamine | 1.5 | .7 |
| Water | 119.3 | 70.3 |
| Colloidal silica, 30% aqueous sol'n | 58.5 | 7.2 (as $SiO_2$) |

The dispersion thus obtained had a pH of 7.51, a viscosity greater than 400 centipoises at 34° C. and a surface tension of 42 dynes/cm. at 25° C.

When this composition was applied as a thin coating to linoleum it was found to dry to a lustrous coating without rubbing but the coating was improved upon buffing. In comparison the coating prepared from a similar composition from which the silica had been omitted was relatively lacking in luster. A coating from the wax containing silica was also found to be remarkably resistant to slipping, being much improved in this respect over the coating made from the similar formulation without silica.

It was noted that the presence of the colloidal silica in this case gave a dispersion which was relatively fluid whereas the control without silica was so viscous as to be in the nature of a paste.

Films made on glass plates from the silica-containing composition were more transparent than films made from the similar composition without silica.

*Example 4*

This is an example of still another ester-type wax which is improved by the addition of colloidal silica. This composition was made up according to Method I and contained the following components:

| Component | Parts By Weight | Per cent By Weight of Total |
|---|---|---|
| Candelilla wax (double refined) | 40.0 | 8.2 |
| Oleic acid | 6.0 | 1.3 |
| Triethanolamine | 8.0 | 1.7 |
| Water | 351.8 | 84.8 |
| Colloidal silica, 30% SiO$_2$ | 53.2 | 3.5 (as SiO$_2$) |

The dispersion thus obtained had a pH of 8.07, a viscosity of 4.1 centipoises at 34° C., and a surface tension of 40.6 dynes/cm. at 25° C.

When applied as a thin coating to a linoleum floor this composition was also found to dry to a lustrous coating without rubbing and the coating was found to be slip resistant. By comparison a similar composition without silica gave a coating which was definitely lacking in luster and was very tacky and hence completely unsuitable as a floor coating.

*Example 5*

This is an example of a modification of a hydrocarbon wax dispersion by colloidal silica. The dispersion was made up according to Method II and contained the following components:

| Component | Parts By Weight | Per cent By Weight of Total |
|---|---|---|
| Ceresin wax (white) | 40.0 | 12.64 |
| Oleic acid | 8.0 | 2.53 |
| Triethanolamine | 3.0 | .95 |
| Water | 212.1 | 78.8 |
| Colloidal silica, 30% SiO$_2$ | 53.2 | 5.07 |

The dispersion thus obtained had a pH of 8.04, a viscosity of 18.4 centipoises at 33.5° C., and a surface tension of 31.5 dynes/cm. at 25° C.

When the composition was applied as a thin coating to a linoleum floor and allowed to dry the surface thus obtained was found to have a relatively low luster, which however was improved by buffing. On the other hand, the skid resistance of the coating was very markedly increased as compared to a coating made from a similar composition without silica. Also, it was noted that the composition containing silica dried much faster than that without silica. Without the silica, the wax coating was too soft to be buffed satisfactorily.

*Example 6*

This is an example of a modification of a hydrocarbon wax containing some saponifiable material, by means of colloidal silica. An aqueous dispersion of the wax was made up according to Method I and containing the following components:

| Component | Parts By Weight | Per cent By Weight of Total |
|---|---|---|
| Montan wax (crude) | 40.0 | 8.2 |
| Oleic acid | 10.0 | 2.1 |
| Triethanolamine | 16.0 | 3.3 |
| Water | 363.3 | 82.4 |
| Borax | 4.0 | .8 |
| Colloidal silica, 30% SiO$_2$ | 53.2 | 3.29 |

The dispersion thus obtained had a pH of 8.49, a viscosity of 3.3 centipoises at 33.5° C., and a surface tension of 36.4 dynes/cm. at 25° C. Coatings made from this composition on linoleum floors were found to have improved skid resistance and improved luster as compared with coatings made from a similar composition without colloidal silica.

*Example 7*

This is an example of an aqueous dispersion of still another ester-type wax containing colloidal silica. The dispersion was made up according to Method II and contained the following components:

| Component | Parts By Weight | Per cent By Weight of Total |
|---|---|---|
| Ouricury wax (double refined) | 39.0 | 12.3 |
| Oleic acid | 9.0 | 2.84 |
| Triethanolamine | 4.5 | 1.42 |
| Water | 212.9 | 78.6 |
| Colloidal silica, 30% SiO$_2$ | 51.8 | 4.95 (as SiO$_2$) |

The dispersion thus obtained had a pH of 7.59, a viscosity of 47.2 centipoises at 32° C., and a surface tension of 32.9 dynes/cm. at 25° C.

It was noted in the preparation of the dispersion that the colloidal silica aided in dispersing the wax, and produced a more uniformly dispersed wax of smaller particle size than was obtained when the silica was omitted.

A coating made from the composition on linoleum was found to have substantially improved skid resistance as compared to a similar coating made from a composition which was identical except that the silica was omitted.

*Example 8*

This is an example of an aqueous dispersion containing colloidal silica and still another hydrocarbon-type wax. It was made up according to Method II and contained the following components:

| Component | Parts By Weight | Per cent By Weight of Total |
|---|---|---|
| Paraffin wax (melting point 133–135° F.) | 40.0 | 12.40 |
| Oleic acid | 8.0 | 2.48 |
| Triethanolamine | 3.0 | 9.3 |
| Water | 208.6 | 77.4 |
| Colloidal silica, 30% SiO$_2$ | 59.8 | 5.57 |

This composition, when applied to linoleum, gave a coating which was definitely slip resistant as compared with a coating made from a similar composition without the colloidal silica.

*Example 9*

This is an example of an aqueous dispersion containing colloidal silica and a wax which is usually classified with the ester-type waxes but which is chemically sometimes classified as a fat, namely, japan wax. This dispersion was prepared according to Method III and contained the following components:

| Component | Parts By Weight | Per cent By Weight of Total |
|---|---|---|
| Japan wax | 40.0 | 12.25 |
| Triethanolamine | 4.0 | 1.23 |
| Oleic acid | 8.0 | 2.46 |
| Water | 222.2 | 79.3 |
| Colloidal silica, 30% SiO₂ | 53.2 | 4.90 |

The dispersion thus obtained at a pH of 7.54, a viscosity of 95 centipoises at 33.5° C., and a surface tension of 32.1 dynes/cm. at 25° C.

When this composition was applied as a thin coating to linoleum it was found to dry to a film which had substantially improved luster and slip resistance as compared with a similar film prepared from a similar wax composition without silica.

*Example 10*

This is an example of a paste wax containing colloidal silica and a synthetic wax which is a complex nitrogen derivative of a higher fatty acid. This synthetic wax is known as "acrawax," the wax used having the following characteristics as described in trade bulletins entitled "Chemicals Glyco" published by Glyco Products Co., copyright 1942 and 1945: "'Acrawax' is a hard, light brown, high luster synthetic wax having a melting point of 95 to 97° C., a flash point of 230° C. (open cup), a specific gravity of 1.04 at 24° C. and .923 at the melting point, and a saponification value of 49. It is insoluble in cold water, completely soluble in hot alcohol, hot butyl acetate, and hot turpentine. It is completely soluble in hot toluol and partially soluble in hot naphtha but forms a gel on cooling in both cases. It is also soluble in hot mineral oil or hot vegetable oil." The aqueous wax dispersion containing colloidal silica was made up according to Method III and contained the following components:

| Component | Parts By Weight | Per cent By Weight of Total |
|---|---|---|
| Synthetic wax | 40.0 | 12.18 |
| Triethanolamine | 4.0 | 1.22 |
| Oleic acid | 8.0 | 2.44 |
| Potassium hydroxide | 0.5 | .15 |
| Water | 222.2 | 79.1 |
| Colloidal silica, 30% SiO₂ | 53.2 | 4.88 (as SiO₂) |

The dispersion thus obtained was a paste. As compared to a control without silica this composition, when applied to a linoleum floor was found to have substantially shortened drying time, somewhat improved slip resistance, and a slightly better luster. It was noted that the degree of dispersion of the wax was greatly improved when the silica was present.

*Example 11*

This is another example of a synthetic polymeric wax, the usefulness of which in aqueous dispersion is increased by the addition of colloidal silica. The wax was a telomer of the ethylene-dichloracetic acid type. It was prepared by the low pressure telomerization of ethylene with dichloracetic acid as described in Hanford and Joyce United States Patent 2,440,800, issued May 4, 1948. More particularly, the wax was prepared by a process of Example XII of said patent except that the charge to the autoclave was 20 parts by weight of dichloroacetic acid, 160 parts of water, and 0.6 part of benzoyl peroxide, the ethylene pressure average 950 atmospheres, and the temperature average 120° C. The telomer was a waxy solid, containing 3.47% chlorine, equivalent to 67 ethylene units per dichloroacetic acid.

The aqueous silica-wax dispersion was made up with the following components in the indicated parts by weight:

| Component | Parts by weight |
|---|---|
| Synthetic wax | 3.4 |
| Beeswax | 1.7 |
| Ceresin wax | 1.7 |
| Turpentine | 3.0 |
| Naphtha | 2.7 |
| Stearic acid | 0.9 |
| Triethanolamine | 1.0 |
| Colloidal silica, 30% SiO₂ | 7.4 |

The waxes and stearic acid were melted together and the triethanolamine added. This mixture was heated to 90° C. and the naphtha and turpentine were added to the resulting hot mixture at such a rate that a clear solution was maintained throughout the addition. The colloidal silica solution was then heated to boiling and poured in with vigorous stirring to produce a smooth emulsion. Stirring was continued until the dispersion had set to a firm gel.

As compared to a similar composition made without colloidal silica, the composition of the present example was found to give coatings on linoleum floors which had improved skid resistance and improved luster.

It was noted that other ethylene telomers such as those of ethylene and bromacetic acid, dioxolane, and pentachloroethylbenzene also gave aqueous dispersions which were improved by the inclusion of colloidal silica.

*Example 12*

While ester-type waxes are sometimes used alone in wax polishes, the preferred waxes are usually so expensive that in commercial practice lower cost blends are used. This example is an illustration of the effectiveness of colloidal silica in improving the luster and slip resistance of a blend of ester type waxes.

An aqueous dispersion was made up according to Method I using the following components:

| Component | Parts by weight | Percent by weight of total |
|---|---|---|
| Carnauba wax (No. 2 North Country) | 20.0 | 4.42 |
| Candelilla wax (double refined) | 20.0 | 4.42 |
| Oleic acid | 6.0 | 1.32 |
| Triethanolamine | 8.0 | 1.77 |
| Borax | 4.0 | .88 |
| Water | 342.1 | 83.8 |
| Colloidal silica 30% SiO₂ | 53.2 | 3.54 (as SiO₂) |

The dispersion had a pH of 8.58, a viscosity of 2.60 centipoises at 32° C. and surface tension of 37.1 dynes/cm. at 25° C.

As compared with a similar composition containing no silica, the dispersion had substantially improved slip resistance and drying time and somewhat improved luster when applied to a linoleum floor. The composition was also used for polishing wood floors and furniture and was found to give a hard glossy coating without further buffing.

Example 13

This is an example of the improvement of an aqueous wax dispersion by means of a different colloidal silica solution than that used in the foregoing examples. In this case the colloidal silica was a 15.6% SiO₂ solution and was the solution described above as having an SiO₂ content of about 15% and an average molecular weight of 11 million. The dispersion was made up according to Method III and contained the following components:

| Component | Parts By Weight | Per cent By Weight of Total |
| --- | --- | --- |
| Carnauba wax (No. 2 North Country) | 40.0 | 11.73 |
| Triethanolamine | 4.0 | 1.18 |
| Oleic acid | 8.0 | 2.36 |
| Potassium hydroxide | 0.5 | .15 |
| Water | 185.1 | 79.4 |
| Colloidal silica 15.6% SiO₂ | 102.6 | 4.54 (as SiO₂) |

The dispersion had a pH of 8.16, a viscosity of 17.9 centipoises at 33.5° C. and a surface tension of 32.1 dynes/cm. at 25° C.

When the solution was applied as a thin coating to linoleum floors it was found to give a film which upon drying was substantially improved with respect to slip resistance and luster as compared with a control containing no silica.

Example 14

A typical commercial wax emulsion used for polishing floors, furniture, automobiles, etc., was modified by adding about 15 parts of an 18% solution of sodium-stabilized colloidal silica to 100 parts of the wax dispersion. The mixture was then applied to one-half of the top of an automobile in the usual manner, the other half of the automobile was waxed with the unmodified wax emulsion. After daily exposure to summer weather and three washings with an anionic type wetting agent, it was noted that the surface which had been waxed with the silica-containing formulation remained hydrophobic, showing the continued presence of a protective wax coating, while the surface which had been waxed with the unmodified formulation could be readily wetted by water, indicating that no protective wax layer remained.

I claim:

1. A wax emulsion polishing composition comprising an aqueous wax emulsion and silica, the silica being in the form of dispersed particles having a particle size of 1 to 100 millimicrons and in an amount sufficient to impart skid resistance to a dried film of the composition.

2. A wax emulsion polishing composition comprising an aqueous ester-wax emulsion and silica, the silica being in the form of dispersed particles having a particle size of 1 to 100 millimicrons and in an amount sufficient to impart skid resistance to a dried film of the composition.

3. A wax emulsion polishing composition comprising an aqueous carnauba wax emulsion and silica, the silica being in the form of dispersed particles having a particle size of 1 to 100 millimicrons and in an amount sufficient to impart skid resistance to a dried film of the composition.

4. A wax emulsion polishing composition comprising an aqueous wax emulsion and silica, the silica being in the form of dispersed particles having an average ultimate particle size of 1 to 30 millimicrons and in an amount sufficient to impart skid resistance to a dried film of the composition.

5. A wax emulsion polishing composition comprising an aqueous wax emulsion and silica, the silica being in the form of dispersed particles having a particle size of 1 to 100 millimicrons and in an amount sufficient to impart skid resistance to a dried film of the composition, and the silica, as an aqueous dispersion without the wax present, having an extinction coefficient of less than 0.25.

6. A wax emulsion polishing composition comprising an aqueous wax emulsion, containing about 10 to 15% by weight of wax, and about 3 to 9% by weight of silica, calculated as SiO₂, the silica being in the form of dispersed particles having a particle size of 1 to 100 millimicrons.

7. A wax emulsion polishing composition comprising an aqueous ester-wax emulsion and silica, the silica being in the form of dispersed particles having an average ultimate particle size of 1 to 30 millimicrons and in an amount sufficient to impart skid resistance to a dried film of the composition, and the silica, as an aqueous dispersion without the wax present, having an extinction coefficient of less than 0.25.

8. A wax emulsion polishing composition comprising an aqueous ester-wax emulsion, containing about 10 to 15% by weight of wax, and about 3 to 9% by weight of silica, the silica being in the form of dispersed particles having an average ultimate particle size of 1 to 30 millimicrons and the silica, as an aqueous dispersion without the wax present, having an extinction coefficient of less than 0.25.

RALPH K. ILER.

REFERENCES CITED

The following references are of record in the file of this patent:

UNITED STATES PATENTS

| Number | Name | Date |
| --- | --- | --- |
| 1,774,665 | Pierce | Sept. 2, 1930 |
| 2,244,325 | Bird | June 3, 1941 |
| 2,374,474 | Dolian | Apr. 24, 1945 |
| 2,408,654 | Kirk | Oct. 1, 1946 |
| 2,432,484 | Moulton | Dec. 9, 1947 |

FOREIGN PATENTS

| Number | Country | Date |
| --- | --- | --- |
| 407,028 | Great Britain | Mar. 3, 1934 |